Oct. 13, 1970 L. S. LACY 3,533,231
METHOD OF OPERATING AND APPARATUS FOR AN ISOTHERMAL
DUAL CONVERSION STEAM POWER PLANT
Filed July 15, 1968 4 Sheets-Sheet 2

INVENTOR.
LEWIS S. LACY

BY

*Head & Johnson*
ATTORNEYS

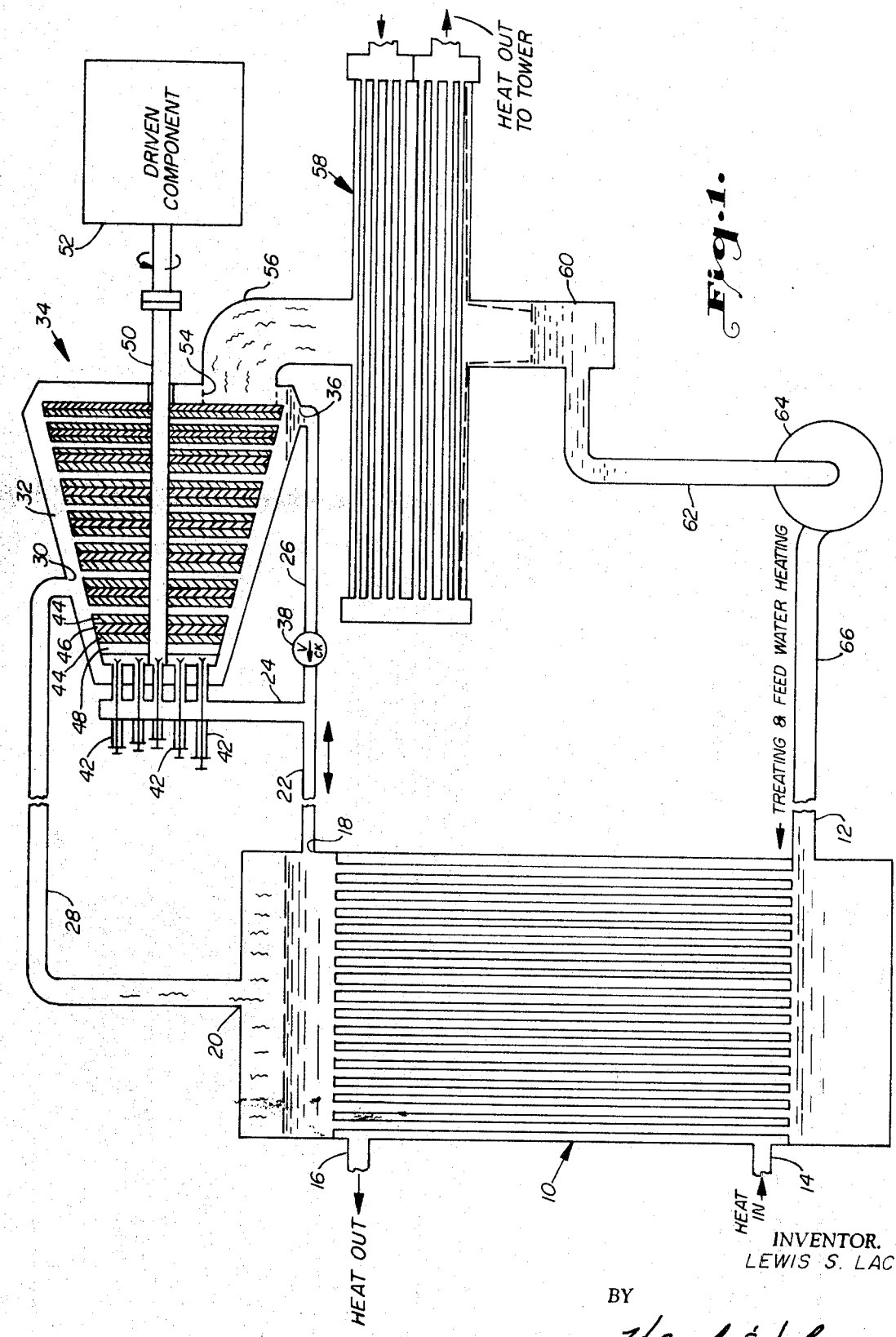

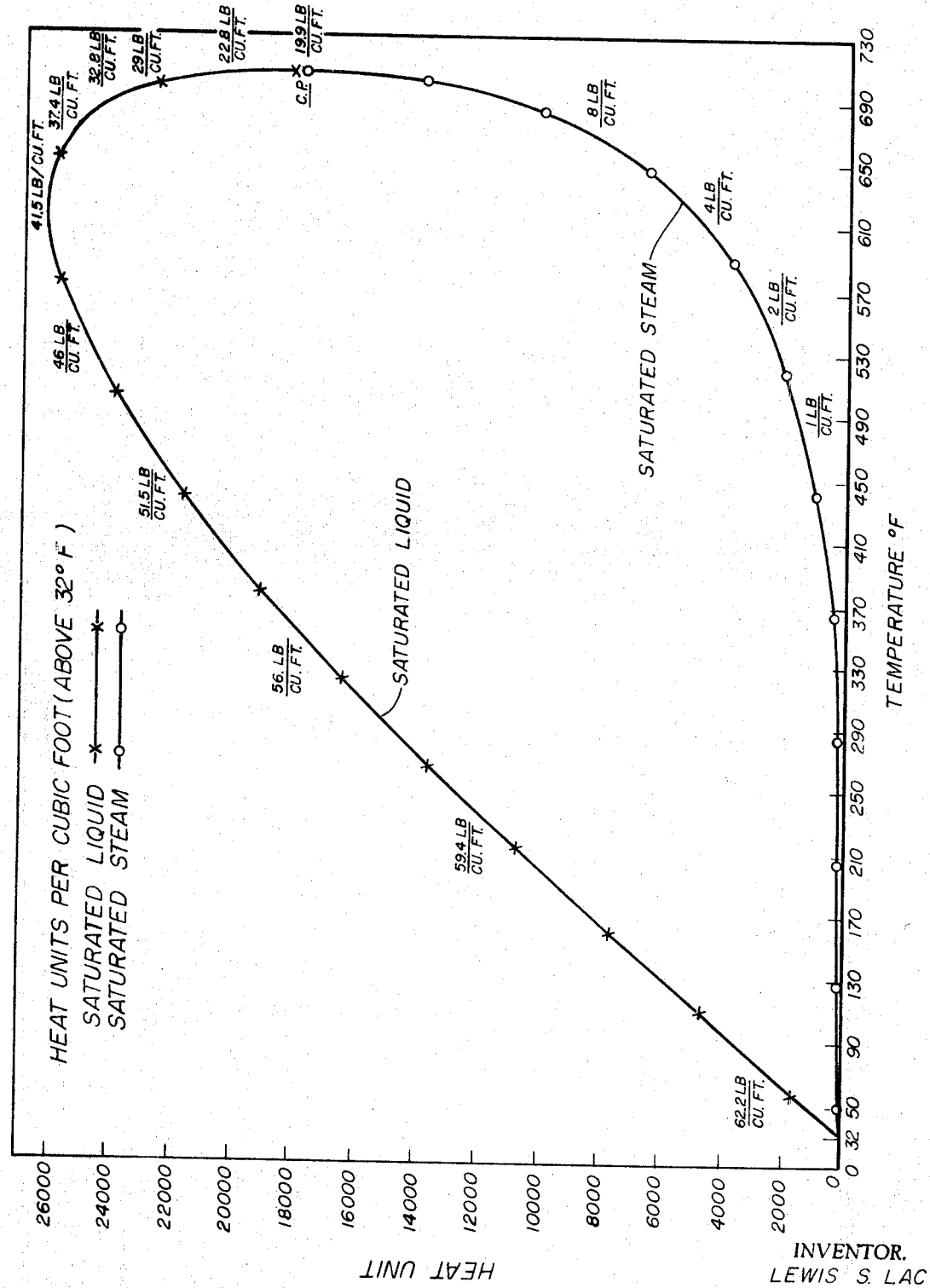

INVENTOR.
LEWIS S. LACY

United States Patent Office 3,533,231
Patented Oct. 13, 1970

3,533,231
METHOD OF OPERATING AND APPARATUS FOR AN ISOTHERMAL DUAL CONVERSION STEAM POWER PLANT
Lewis S. Lacy, 1111 Eric, Arlington, Tex. 76010
Filed July 15, 1968, Ser. No. 745,033
Int. Cl. F01k 21/02; F22b 27/14
U.S. Cl. 60—27                                6 Claims

ABSTRACT OF THE DISCLOSURE

A method of operating an isothermal dual conversion steam power plant is described along with the apparatus employed therewith. Steam from a conventional boiler is delivered from the boiler to a jacketed turbine while simultaneously liquid of the same temperature range is delivered to transpiration nozzles within the turbine which break up the liquid stream into fine particles and deliver the particles through a heating zone against tungsten carbide coated turbine blades. Thus, expansion of the state change from liquid into vapor takes place within the turbine. After expending its energy, this steam developed from the vaporization of the liquid passes from the turbine as 100° F. vapor which can be condensed and recycled to the boiler. Meanwhile, the steam entering the jacket at 580° to 630° F. condenses on giving up its latent heat within the above temperature range and is utilized at the nozzles.

BACKGROUND OF THE INVENTION

This invention relates to a new and improved method of generating power from steam and to a new and improved apparatus for converting heat to mechanical power. More particularly, this invention relates to a new and improved type of steam turbine.

Steam power plants may be described as being of one of two types, a sub critical plant, or a super critical plant. These terms refer to the temperature at which the plant operates.

The critical temperature of water is 705.4° F. and is the temperature above which steam ceases to exist as a vapor in equilibrium with liquid. Sub critical steam power plants are plants which operate below this critical temperature.

Present day steam power plants operate at low efficiency because of a great loss in heat energy. In those plants which operate with sub critical boilers, a great deal of this heat loss occurs at the liquid vapor phase boundary in the external work of vaporization. In those steam power plants operating with super-critical boilers most of the heat energy loss is caused by the loss of specific gravity of the operation fluid. In super-critical boilers there is a continual loss in specific gravity of the liquid up to the critical point. In either case this loss of specific gravity results in additional heat energy expended and reduced work accomplished. This loss of specific gravity is at the expense of heat but diminishes the heat energy density. No practical pressure can produce any greater heat energy density than exists in liquid state water at approximately 625° F. At 625° F. is found the maximum density of heat energy per unit volume of liquid state water. At 625° F. the weight of liquid state water is 41 pounds per cubic foot and at the critical point, 705.4° F., the weight of the fluid is only 19.9 pounds per cubic foot. Efficient utilization of the heat energy contained in high temperature liquid water can only be accomplished over the range of 450° to 690° F. preferably 580° to 630° F. where both the specific gravity and the heat content are at a maximum. Addition of heat to elevate temperature beyond this range only serves to diminish the specific gravity rapidly with a simultaneous reduction of heat energy density to the critical point where even at double the saturation pressure of 625° F. water the heat content per unit volume is the same as that of 345° F. saturated liquid water and the specific gravity is little more than one third that of the 345° F. saturated liquid water. In water, there is no temperature or pressure which can be achieved at which heat energy per unit mass is sufficient in the liquid state to bring about complete state change to a gas even though it may be subjected to very low absolute pressure. Unflashed liquid is a determent to velocity through the turbine of that portion flash vaporized to steam. Therefore, to make more efficient utilization of this high energy liquid water, heat must be added to the liquid particles within the confines of the turbine.

The primary object of this invention is to provide a method of operating a steam power plant with high efficiency.

Another object of this invention is to provide a method of operating a steam power plant sub-critically and with high efficiency.

Another object of this invention is to provide a method of converting heat energy to mechanical energy through the operation of a sub-critical steam turbine.

Still another object of this invention is to provide a method of operating a sub-critical steam turbine by efficient utilization of heat energy within the turbine.

Still another object of this invention is to provide a steam turbine capable of operating sub-critically at high efficiency.

Still another object of this invention is to provide a steam turbine capable of operating at high efficiency through higher utilization of heat energy within the turbine by means of a change of state of sub-critical liquid to steam within the turbine.

BRIEF DESCRIPTION OF THE DRAWINGS

Further objects and advantages of the invention will become apparent from the following description and claims, and from the accompanying drawings, wherein:

FIG. 1 is a schematic diagram of a sub-critical steam power plant according to this invention.

FIG. 4 is a graph of the value of heat units per cubic foot of both saturated liquid water and saturated steam.

DESCRIPTION OF THE PREFERRED EMBODIMENTS

Figure 2:
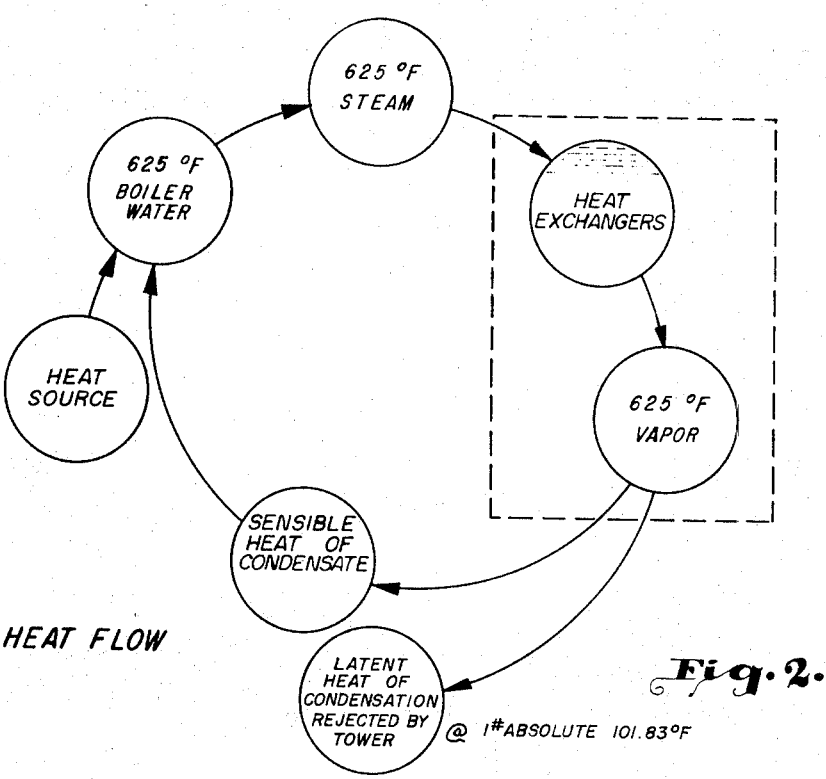
FIG. 2 is a schematic diagram showing the flow of heat in a steam power plant according to this invention.

This invention describes a method of operating a steam power plant which includes a new and unique steam turbine. The method of driving the steam turbine of this invention includes the steps of heating water in a conventional steam boiler to a preferred temperature of 630° F. under sub-critical conditions, delivering liquid at 630° F. to an expansion zone within the turbine, while simultaneously delivering steam at 630° F. to heat exchange means cooperating with the turbine to maintain the interior of the turbine at a temperature of 630° F. Condensate from the steam passing through the heat exchangers is collected at 630° F. and is conveyed back to the boiler or through the transpiration nozzles zone as finely divided particles in vapor and caused to impinge against tungsten carbide coated rotor and stator blades of the turbine. The finely divided liquid particles and vapor expand isothermally to vapor within a temperature range of 580° to 630° F. At the outlet of the turbine the expanded vapor is collected as steam at a temperature of approximately 100° F. The 100° steam then condenses to 100° liquid and is recycled to the boiler.

Referring now to the drawings in detail, FIG. 1 describes schematically the method of driving a steam turbine according to this invention and the unique arrangement of components of a steam turbine according to this invention. A conventional steam boiler 10, which may be of any suitable type, is connected to a source of water supply 12, and is heated by suitable heat supply means 14, such as a supply of hot gas. Exhaust means 16 are provided for the release of spent gas from the boiler. An outlet 20 is provided for the passage of steam from the boiler. The supply of water to the boiler may be controlled manually or automatically as desired, and may be made up of condensate, or fresh water, or a combination of the two. Heat supply to the boiler may be controlled manually or automatically as the system demands. Steam outlet 20 communicates with the steam line 28 which in turn communicates with steam inlet 30 of steam jacket 32 of turbine 34. Water line 26 communicates with condensate outlet 36 of steam jacket 32 to conduct condensate to either the boiler 10 or to the above mentioned transpiration nozzles, with return flow prevented by means 38 such as a check valve.

Water line 24 conducts the condensate to the transpiration nozzles 42 which convert this liquid to fine particles of liquid and steam within the interior of turbine 34 as before described. Each of the nozzles 42 may be adjusted independently, manually or automatically, or they may be so connected that they may be adjusted together either manually or automatically. Transpiration nozzles 42 are arranged to penetrate steam jacket 32 of turbine 34 so that the vapor and fine water particles emanating therefrom are released within turbine 34 and are directed toward a series of rotors 44 and stators 46 within turbine 34. Steam jacket 32 communicates with a plurality of heat exchanger areas 48 through which steam from boiler 10 passes to maintain the interior of turbine 34 at a temperature substantially equal to that of steam emanating from boiler 10. In this manner, finely divided water particles coming from nozzles 42 are more easily converted to vapor within the turbine itself and with greater efficiency than was the driving fluid of the turbine converted from liquid water to steam at a remote point. Thus, this latent heat energy transferred from the steam passing through heat exchangers 48, efficiently converts the finely divided water particles to vapor and at the same temperature at which the water particles were discharged from nozzles 42.

The most efficient temperature range for operation of boiler 10 and turbine 34 has been found to be the range of 580° to 630° F. initial and 101° F. final. Thus, two sources of heat energy are given to the water vapor or steam now driving rotor blades 44 in turbine 34, these are the sensible heat of the condensate entering the turbine as vapor and the finely divided liquid particles, and the additional acceleration given the particles by reason of their conversion to vapor by means of heat acquired within the turbine.

Each of the heat exchangers 48 is positioned adjacent to and is in a plane parallel to one of the rotor blades 44. Heat exchangers 48 may be of any suitable configuration. They may comprise tubing wound helically or concentrically within turbine 34, they may comprise tubing wound grid-like from side to side of turbine 34, or they may comprise hollow plate-like components positioned concentrically within turbine 34. No matter what the configuration, heat exchangers 48 must have openings therein to permit the finely divided water particles and steam vapor to move axially along the turbine 34.

It is also within the contemplation of this invention that stators 46 may be constructed to provide passage of steam internally thereof so that stators 46 may act as heat exchangers by communication with steam jacket 32. Rotors 44 are connected to a drive shaft 50 rotatably positioned in turbine 34. Drive shaft 50 may be connected by conventional means to driven component 52 which may be a generator, pump, or other mechanical device.

After the expanded vapor has passed through the various rotors and stators within turbine 34 it passes from turbine 34 through outlet 54 which communicates with steam pipe 56. This steam entering pipe 56 has accomplished work in driving turbine 34 by reason of which it has given up energy as temperature and now exits from turbine 34 at a lower temperature than that at which it entered turbine 34 as flashing liquid and vapor from nozzles 42. This low temperature steam may now be condensed to liquid water by passage through a conventional heat exchanger 58, after which the condensed steam may be collected in a water reservoir 60 preparatory to passage through water line 62, pump 64, and water line 66 connected to water supply 12. Thus, water supply 12 may be a suitable combination of fresh water supply and recycled water from water line 66 and may be regulated automatically according to the demand of the system.

FIG. 2 describes schematically the flow of heat energy when the steam turbine is operated according to the concept of this invention preferred temperature of 625° F. At approximately 625° F. the heat energy per unit volume is at a maximum for liquid water. Inside the turbine there is as effective exchange of heat between the liquid water passing from nozzle 42 and steam entering heat exchangers 48 of approximately 453 B.t.u. per pound. After giving up 453 B.t.u. per pound the steam passing through heat exchangers 48 condenses as liquid water at 625° F. and passes through condensate outlet 36 to the nozzles. FIG. 2 also shows that after the exchange of heat between steam and liquid water from nozzles 42, the vaporized water passing through the rotors and stators of the turbine, performs work and passes through steam outlet 54 as approximately 101° F. steam. This 101° steam is condensed ti liquid by passage through an external heat exchanger and the condensate therefrom is recycled through the boiler.

Figure 3:
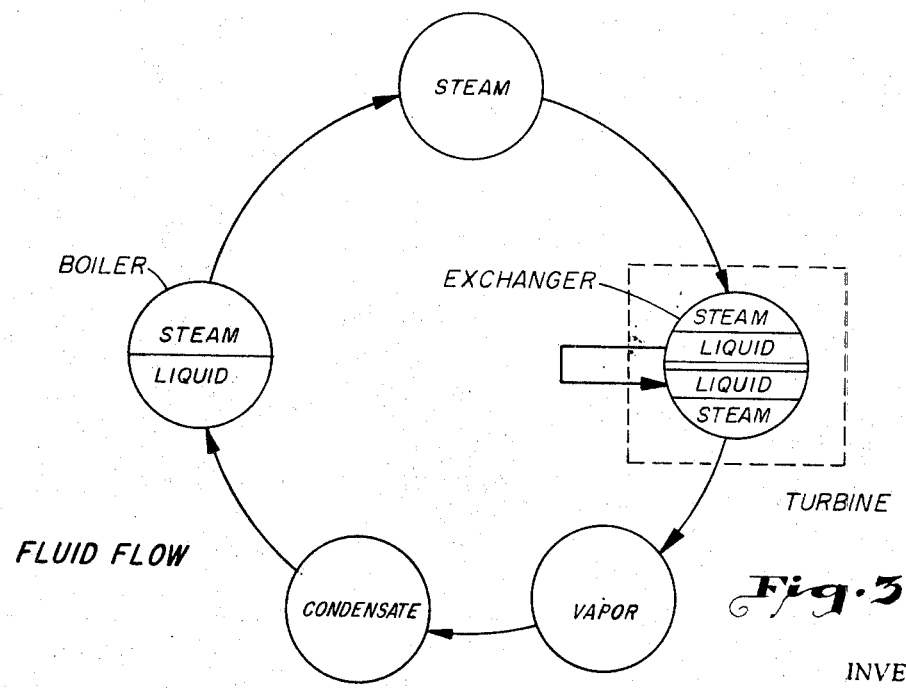
FIG. 3 is a schematic diagram showing the fluid flow in a steam power plant according to this invention.

FIG. 3 describes the fluid flow within the steam power plant described by this invention. Steam from the boiler passes into the heat exchangers inside the turbine where the steam condenses to liquid water upon giving up its latent heat. The liquid water then passes from the heat exchanger to the transpiration nozzles inside the turbine. Upon being vaporized by the additional heat from the steam from the heat exchangers, the vaporized liquid then performs work within the turbine and passes from the turbine at a lower temperature, is condensed and is recycled to the boiler.

Figure 5:
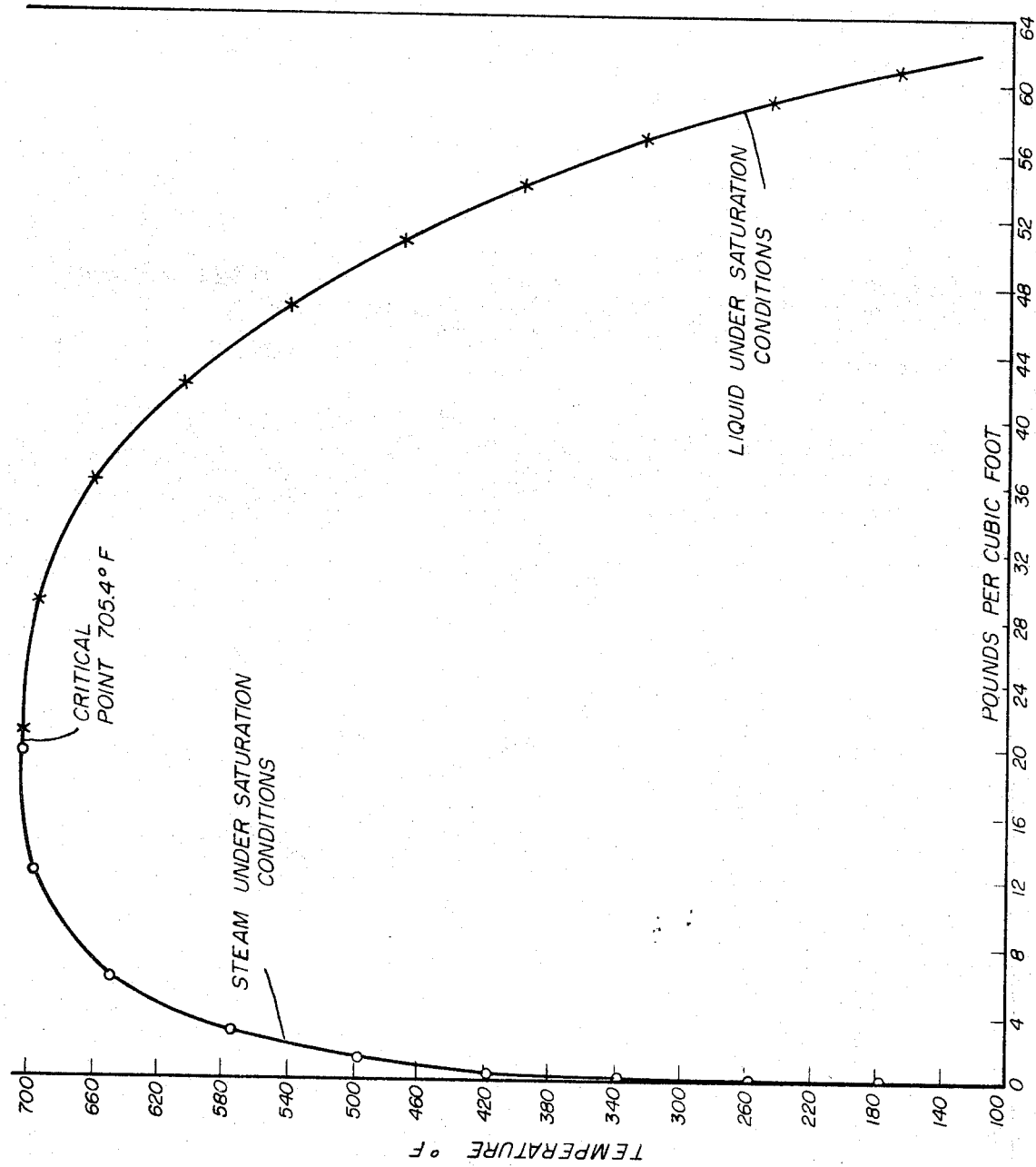
FIG. 5 is a graph showing the relationship of specific gravity to temperature of steam and liquid water both at saturated conditions.

FIGS. 4 and 5 are graphs of certain physical properties of liquid water under saturated conditions and steam under saturated conditions. FIG. 4 is a graph of heat units in B.t.u. against temperature for liquid water and saturated steam showing the continuity of these properties in either direction from 32° F. to the critical point, 705.4° F. On this graph the weight per cubic foot or specific gravity is shown at selected points for both liquid water and steam. FIG. 5 is a graph of the relationship of pounds per cubic foot at various temperatures of both liquid water under saturation conditions and steam under saturation conditions. Both of these graphs might be described as identifying sub-critical conditions since in each case the limiting temperature is the temperature at the critical point, 705.4° F. FIG. 4 indicates that the maximum heat content per cubic foot of liquid water occurs approximately over the temperature range 580° to 630° F. Also, it is noted that over this temperature range the density or pounds per cubic foot of liquid water is at a range of intermediate values, since the minimum density, 19.9 pounds per cubic foot, occurs at the critical point, and the maximum density occurs at approximately 39° F. Thus, the most efficient temperature range for conversion of this liquid water to steam in terms of both heat content per cubic foot and specific gravity occurs at a range of 580° to 630° F. as its heat content is at a maximum, the latent heat required to convert this liquid water to steam at the same temperature will be considerably less than at a lower temperature and considerably higher specific gravity.

Since many different embodiments of this invention may be made without departing from the spirit and scope thereof, it is to be understood the specific embodiments described in detail herein are not to be taken in a limiting sense, since the scope of the invention is best defined by the appended claims considering the prior art.

What is claimed:

1. A method of driving a steam turbine comprising the steps of:
    heating water in a heating means to a temperature within the range of 450° to 690° F. at saturation conditions;
    delivering saturated steam from said heating means to at least one heat exchanger within said turbine, said heat exchanger being in proximity to an expansion zone;
    supplying liquid either as the condensate emitting from said heat exchanger and/or from said heating means;
    delivering said liquid to at least one transpiration nozzle at said expansion zone within said turbine wherein said liquid is reconverted into steam and finely divided liquid particles;
    causing said liquid particles, passing into said expansion zone, to expand to a vapor state by means of heat from said heat exchanger to drive rotor blades of said turbine;
    collecting and condensing steam from said turbine passage; and
    recycling said condensate to said heating means.

2. Method of claim 1 wherein said collecting and condensing from said turbine occurs at 101° F.

3. Method of claim 1 wherein said heating and delivering temperature ranges from 580° to 630° F.

4. A sub-critical steam turbine comprising:
    a housing;
    a housing shell within said housing to contain steam, said housing shell having an inlet and an outlet;
    a shaft journaled in said housing;
    a rotor blade positioned on said shaft;
    a stator blade secured to said housing paralleled to and adjacent to said rotor blade;
    dispersion means at one end of said turbine communicating with the interior of said turbine and having an inlet connectible to a supply of liquid, said dispersion means to convert said liquid to finely divided particles and direct said particles to said rotor blades; and
    heat exchange means planarly adjacent said rotor blade communicating with said housing shell, said heat exchange means arranged to permit heat exchange contact therewith of said finely divided liquid particles.

5. A sub-critical steam turbine as described in claim 4, wherein:
    said turbine includes a plurality of rotor blades each of which is positioned adjacent at least one of each of a plurality of stator blades.

6. A sub-critical steam turbine as described in claim 5, wherein:
    said dispersion means includes a transpiration nozzle.

References Cited

UNITED STATES PATENTS

| | | | |
|---|---|---|---|
| 850,196 | 4/1907 | Warman | 60—108 |
| 976,236 | 11/1910 | Weiss | 60—39.19 |
| 2,456,417 | 12/1948 | Horsdal | 60—108 |
| 2,961,835 | 11/1960 | Kastner | 60—108 |
| 2,968,157 | 1/1961 | Cronan | 60—108 |
| 2,968,602 | 1/1961 | Loeb | 60—108 |
| 3,190,072 | 6/1965 | Berryer | 60—108 XR |
| 3,312,065 | 4/1967 | Guin | 60—108 |

FOREIGN PATENTS

| | | |
|---|---|---|
| 513,459 | 10/1939 | Great Britain. |
| 666,850 | 10/1938 | Germany. |

MARTIN P. SCHWADRON, Primary Examiner
R. BUNEVICH, Assistant Examiner

U.S. Cl. X.R.
60—108; 122—40